(12) United States Patent
Xie

(10) Patent No.: US 10,455,772 B2
(45) Date of Patent: Oct. 29, 2019

(54) LIGHT EMITTING DEVICE AND METHOD OF REGULATING PLANT GROWTH USING THE SAME

(71) Applicants: BOE TECHNOLOGY GROUP CO., LTD., Beijing (CN); BOE Optical Science and Technology Co., Ltd., Suzhou, Jiangsu (CN)

(72) Inventor: Wei Xie, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 215 days.

(21) Appl. No.: 15/534,731

(22) PCT Filed: Jan. 6, 2017

(86) PCT No.: PCT/CN2017/070409
§ 371 (c)(1),
(2) Date: Jun. 9, 2017

(87) PCT Pub. No.: WO2017/173871
PCT Pub. Date: Oct. 12, 2017

(65) Prior Publication Data
US 2018/0199519 A1    Jul. 19, 2018

(30) Foreign Application Priority Data
Apr. 8, 2016   (CN) .......................... 2016 1 0218900

(51) Int. Cl.
*H05B 37/02*   (2006.01)
*A01G 7/04*   (2006.01)
(Continued)

(52) U.S. Cl.
CPC ............... *A01G 7/045* (2013.01); *A01G 9/20* (2013.01); *H05B 33/0809* (2013.01);
(Continued)

(58) Field of Classification Search
CPC ......... G09G 3/3406; G09G 2320/0633; G09G 2320/062; G09G 2320/064;
(Continued)

(56) References Cited

U.S. PATENT DOCUMENTS 8,018,425 B2 *  9/2011  Oh ..................... H05B 33/0815
                                                313/463
8,243,278 B2 *  8/2012  Valois ................ H05B 37/0254
                                                356/213

(Continued)

FOREIGN PATENT DOCUMENTS

CN    101724547 A    6/2010
CN    201746536 U    2/2011
(Continued)

OTHER PUBLICATIONS

First Office Action dated Apr. 28, 2017 in corresponding Chinese Patent Application No. 201610218900.2.
(Continued)

*Primary Examiner* — Haissa Philogene
(74) *Attorney, Agent, or Firm* — Nath, Goldberg & Meyer; Joshua B. Goldberg; Daniel Bissing

(57) ABSTRACT

The present disclosure provides a light emitting device and a method of regulating plant growth using the same. In the light emitting device of the present disclosure, the drive module is connected to the light source and the dimming control module, the dimming control module is configured to output a control signal to the drive module, and the drive module is configured to adjust brightness of the light source according to the control signal. Further, brightness of the
(Continued)

light source is adjusted according to the control signal, so as to automatically turn on and off the light source at regular time, and meanwhile, a natural transition process of brightness change is inserted between lighting and lighting-off to simulate dusk and dawn.

11 Claims, 2 Drawing Sheets

(51) Int. Cl.
*A01G 9/20* (2006.01)
*H05B 33/08* (2006.01)

(52) U.S. Cl.
CPC ..... *H05B 33/0854* (2013.01); *H05B 37/0281* (2013.01); *Y02P 60/146* (2015.11)

(58) Field of Classification Search
CPC ............ H05B 33/0815; H05B 33/0842; H05B 33/0809; H05B 33/0854; H05B 37/02; H05B 37/0281; Y02B 20/346; Y02B 20/347; A01G 7/045; A01G 7/06; A01G 9/06
See application file for complete search history.

(56) References Cited

U.S. PATENT DOCUMENTS

| | | | | |
|---|---|---|---|---|
| 8,427,073 | B2* | 4/2013 | Kung | G09G 3/3406 315/193 |
| 8,519,566 | B2* | 8/2013 | Recker | H02J 9/065 307/64 |
| 8,735,057 | B2* | 5/2014 | Braslau | A61K 31/69 435/4 |
| 2013/0263503 | A1 | 10/2013 | Bostdorff | |

FOREIGN PATENT DOCUMENTS

| | | |
|---|---|---|
| CN | 101984735 A | 3/2011 |
| CN | 202587533 U | 12/2012 |
| CN | 103210797 A | 7/2013 |
| CN | 203104847 U | 7/2013 |
| CN | 104661393 A | 5/2015 |
| CN | 105246191 A | 1/2016 |
| CN | 105898916 A | 8/2016 |
| CN | 205454177 U | 8/2016 |
| JP | H11-7810 A | 1/1999 |

OTHER PUBLICATIONS

International Search Report dated Mar. 29, 2017 in corresponding International Application No. PCT/CN2017/070409 along with an English translation of the International Search Report and an English translation of the Written Opinion of the International Searching Authority.

* cited by examiner

US 10,455,772 B2

LIGHT EMITTING DEVICE AND METHOD OF REGULATING PLANT GROWTH USING THE SAME

TECHNICAL FIELD

The present disclosure belongs to the technical field of light emitting devices, and particularly relates to a light emitting device and a method of regulating plant growth using the same.

BACKGROUND

In recent years, light emitting diode (LED) light sources, as a new generation of green energy-saving light sources, have been widely used. An LED light source can serve as a light source for plant growth due to its characteristics such as small volume and power conservation.

Inventors have found that at least following problems exist in the prior art: at present, most light sources of this type in the market can provide light irradiation only, but cannot achieve an automatic control of timed lighting and lighting-off; furthermore, in LED light sources in the present market, there is no transition process of brightness change from lighting to lighting-off and from lighting-off to lighting, so the LED light sources in the present market do not match with the actual natural light, and thus cannot fully simulate natural light.

SUMMARY

In view of the problem that existing light sources cannot fully simulate natural light, the present disclosure provides a light emitting device and a method of regulating plant growth using the same.

The technical solutions adopted to solve the technical problem of the present disclosure include:

a light emitting device, which comprises a light source, a drive module and a dimming control module; wherein the drive module is connected to the light source and the dimming control module, the dimming control module is configured to output a control signal to the drive module, the drive module is configured to adjust brightness of the light source according to the control signal, and the dimming control module comprises a first controller configured to perform pulse width modulation (PWM).

Preferably, by means of pulse width modulation, the first controller sequentially outputs:

a high-level control signal with a duration of $h_1$;

a control signal with a duration of $h_2$ in transition from a high level to a low level;

a low-level control signal with a duration of $h_3$; and a control signal with a duration of $h_4$ in transition from the low level to the high level.

Preferably, the first controller circularly outputs the control signal with a duration of $h_1$, the control signal with a duration of $h_2$, the control signal with a duration of $h_3$, and the control signal with a duration of $h_4$, and $h_1+h_2+h_3+h_4=24$ hours.

Preferably, the dimming control module further comprises a second controller, which controls the first controller to reset and output the high-level control signal with a duration of $h_1$ when turned on.

Preferably, the drive module comprises a direct current—direct current (DC-DC) controller, and the dimming control module further comprises a third controller, which controls the DC-DC controller to turn off and controls the first controller to output the low-level control signal with a duration of $h_3$ when turned on.

Preferably, the first controller comprises a microcontroller unit (MCU).

Preferably, the MCU comprises a control chip, a voltage regulator, a sixth capacitor and a seventh capacitor; a sixth port of the control chip is connected to an output port of the voltage regulator, and a seventh port of the control chip is connected to the ground; one terminal of each of the sixth capacitor and the seventh capacitor is connected to the ground, and the other terminals of the sixth capacitor and the seventh capacitor are connected to a fifth port and a fourth port of the control chip, respectively.

Preferably, the light source comprises an LED lamp.

Preferably, the drive module comprises:

a signal receiving terminal for receiving the control signal; and a current adjusting unit configured to adjust an amount of a current input to the light source according to the control signal.

Preferably, the DC-DC controller comprises a power input port, a gate, a ground port, a current sampling port, a PWM receiving port, an output overvoltage protection port, an analog comparator port, and a voltage feedback port.

The present disclosure further provides a method of regulating plant growth using the above light emitting device, and the light emitting device irradiates a plant by following steps of:

irradiating, by the light emitting device, the plant for $h_1$ hour(s), wherein the control signal is at a high level;

irradiating, by the light emitting device, the plant for $h_2$ hour(s), wherein the control signal is in transition from a high level to a low level;

irradiating, by the light emitting device, the plant for $h_3$ hour(s), wherein the control signal is at a low level; and irradiating, by the light emitting device, the plant for $h_4$ hour(s), wherein the control signal is in transition from the low level to the high level, and $h_1+h_2+h_3+h_4=24$.

Preferably, $h_1$ is 13 hours, $h_2$ is 1 hour, $h_3$ is 9 hours, and $h_4$ is 1 hour.

In the light emitting device of the present disclosure, the drive module is connected to the light source and the dimming control module, the dimming control module is configured to output a control signal to the drive module, the drive module is configured to adjust brightness of the light source according to the control signal. Further, brightness of the light source is adjusted according to the control signal, so as to automatically turn on and off the light source at regular time, and meanwhile, a natural transition process of brightness change is inserted between lighting and lighting-off

DETAILED DESCRIPTION

To make those skilled in the art better understand technical solutions of the present disclosure, the present disclosure will be further described in detail below in conjunction with the accompanying drawings and specific implementations.

First Embodiment

Figure 1:
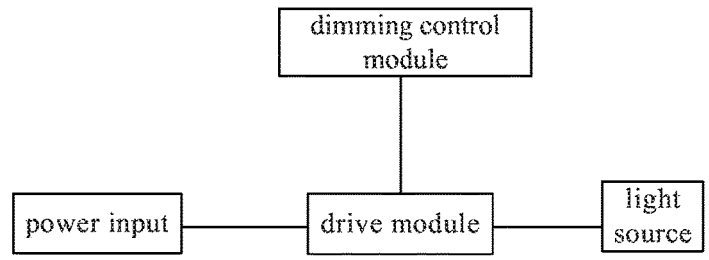
FIG. 1 is a schematic diagram of a structure of a light emitting device in a first embodiment of the present disclosure.

This embodiment provides a light emitting device, which, as shown in FIG. 1, includes a light source, a drive module and a dimming control module.

The drive module is connected to the light source and the dimming control module, the dimming control module is configured to output a control signal to the drive module, the drive module is configured to adjust brightness of the light source according to the control signal, and the dimming control module includes a first controller configured to perform pulse width modulation (PWM).

The drive module in this embodiment adjusts the brightness of the light source according to the control signal, automatically turns on and off the light source at regular time, and may insert, by means of PWM control, a natural transition process of brightness change between lighting and lighting-off to simulate dusk and dawn. When irradiating a plant, the light emitting device can fully simulate sunlight, and thus provides a suitable growth environment for the plant, which is conducive to plant growth. The light emitting device of the present disclosure is suitable for lighting in various occasions, and particularly adapted for regulating plant growth.

Second Embodiment

This embodiment provides a light emitting device, which includes a light source, a drive module and a dimming control module.

The drive module is connected to the light source and the dimming control module, the dimming control module is configured to output a control signal to the drive module, the drive module is configured to adjust brightness of the light source according to the control signal, and the dimming control module includes a first controller configured to perform pulse width modulation.

Preferably, the light source includes an LED lamp.

Specifically, as the light source used in the light emitting device of the present disclosure, an LED lamp is preferably adopted.

Preferably, the dimming control module includes the first controller, which sequentially outputs a high-level control signal with a duration of $h_1$, a control signal with a duration of $h_2$ gradually changing from a high level to a low level, a low-level control signal with a duration of $h_3$, and a control signal with a duration of $h_4$ gradually changing from the low level to the high level.

Preferably, the control signals with a duration of $h_1$, a duration of $h_2$, a duration of $h_3$ and a duration of $h_4$ are output cyclically, and $h_1+h_2+h_3+h_4=24$ hours.

Figure 2:
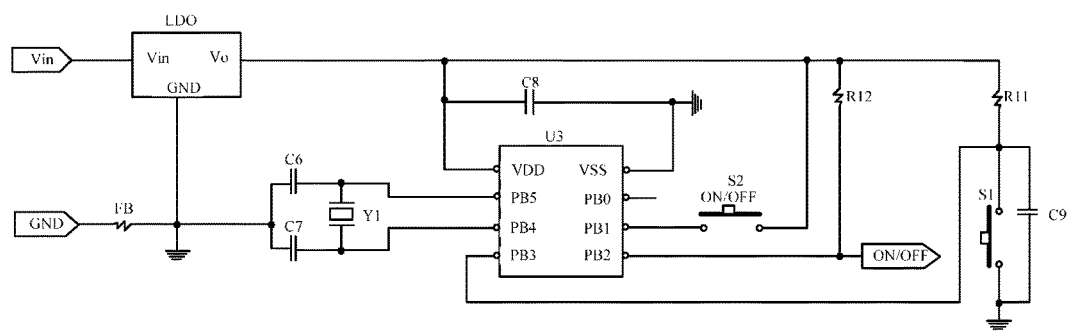
FIG. 2 is a schematic diagram of a circuit of a dimming control module in a second embodiment of the present disclosure.

In other words, as shown in the circuit schematic diagram of the dimming control module of FIG. 2, the first controller is an MCU controller, which includes a control chip U3, a low dropout regulator (LDO), a sixth capacitor C6 and a seventh capacitor C7. A port VDD of the control chip U3 is connected to an output port Vo of the LDO, and a port VSS of the control chip U3 is connected to the ground. Left terminals of the sixth capacitor C6 and the seventh capacitor C7 are connected to the ground, and right terminals of the sixth capacitor C6 and the seventh capacitor C7 are connected to ports PB5 and PB4 of U3, respectively.

A high-level signal with a duration of $h_1$, a PWM signal with a duration of $h_2$ whose duty ratio gradually changes from 100% to 0%, a low-level signal with a duration of $h_3$ and a PWM signal with a duration of $h_4$ whose duty ratio gradually changes from 0% to 100% are circularly output from a port PB2 of the MCU controller. In this case, $h_1+h_2+h_3+h_4=24$ hours, one cycle is just 24 hours, and the signals are constantly cycled to substantially simulate changes of natural sunlight.

Preferably, the dimming control module further includes a second controller, which controls the first controller to reset and output a high-level control signal with a duration of $h_1$ when turned on.

Preferably, the drive module includes a direct current—direct current (DC-DC) controller, and the dimming control module further includes a third controller, which controls the DC-DC controller to turn off and controls the first controller to output a low-level control signal with a duration of $h_3$ when turned on.

In other words, the second controller and the third controller are provided outside the MCU controller. The second controller serves as a reset button, and when the button is pressed, the MCU controller is reset immediately and starts to output a high-level control signal with a duration of $h_1$ again regardless of the status of PB2. The third controller serves as a switch button, and when the button is pressed, the MCU controller outputs a low-level control signal with a duration of $h_3$ and turns off the DC-DC controller regardless of the status of PB2. As shown in the circuit schematic diagram of the dimming control module of FIG. 2, a reset button S1 of the second controller has one end connected to the port PB3 of U3, and the other end connected to the ground. The switch button of the third controller has one end connected to a port PB1 of U3, and the other end connected to a power input port Vin.

Preferably, the drive module includes:

a signal receiving terminal for receiving a control signal; and a current adjusting unit configured to adjust an amount of a current input to the light source according to the control signal.

Figure 4:
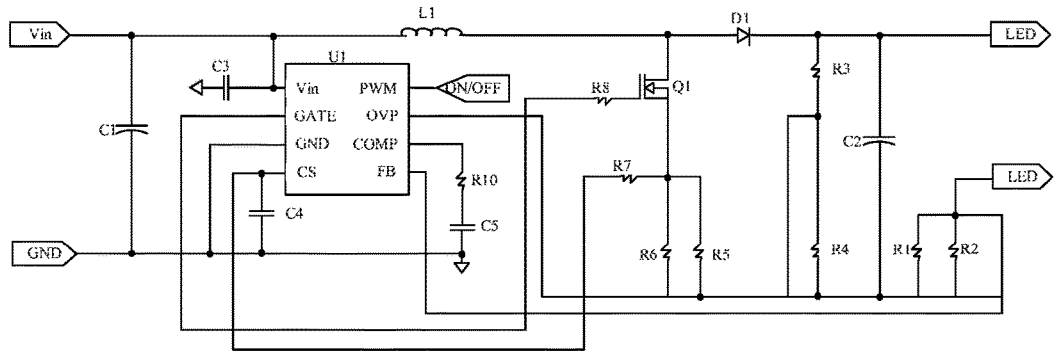
FIG. 4 is a schematic diagram of a drive circuit in the second embodiment of the present disclosure.

That is to say, as shown in FIG. 4, the DC-DC controller includes the power input port Vin, a gate GATE, a ground port GND, a current sampling port CS, a signal receiving port PWM (i.e., PWM enable port), an output overvoltage protection port OVP, an analog comparator port COMP, and a voltage feedback port FB. The port PB2 of the MCU controller is configured to be connected to the PWM enable port.

The DC-DC controller converts an input DC voltage into a constant DC current to light the LED lamp. The PWM enable port can receive the control signal input from the dimming control module. When the dimming control module outputs a high-level signal, the DC-DC controller operates, and when the dimming control module outputs a low-level signal, the DC-DC controller stops operating. Through changes of signals output by the dimming control module between the high-level signal and the low-level signal, control of lighting and lighting-off is achieved.

Specifically, the PWM enable port of the DC-DC controller receives PWM signals of a varied duty ratio to achieve dimming function. When the PWM signal has a duty ratio of 100%, the DC-DC controller outputs 100% of a current, i.e., a full current output; when the PWM signal has a duty ratio ranging between 100% and 0%, the output current ranges between 100% and 0%; when the PWM signal has a duty ratio of 0%, the DC-DC controller outputs 0% of the current, i.e., no current output; when the PWM signal has a duty ratio ranging between 0% and 100%, the output current ranges between 0% and 100%. In this way, dimming control is achieved.

Third Embodiment

Figure 3:
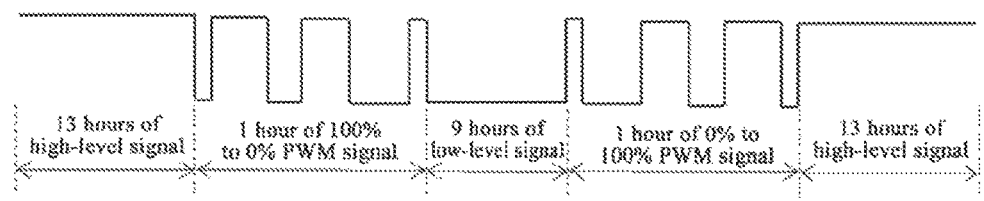
FIG. 3 is a timing diagram of a control signal output by a dimming control module in a third embodiment of the present disclosure.
Figure 5:
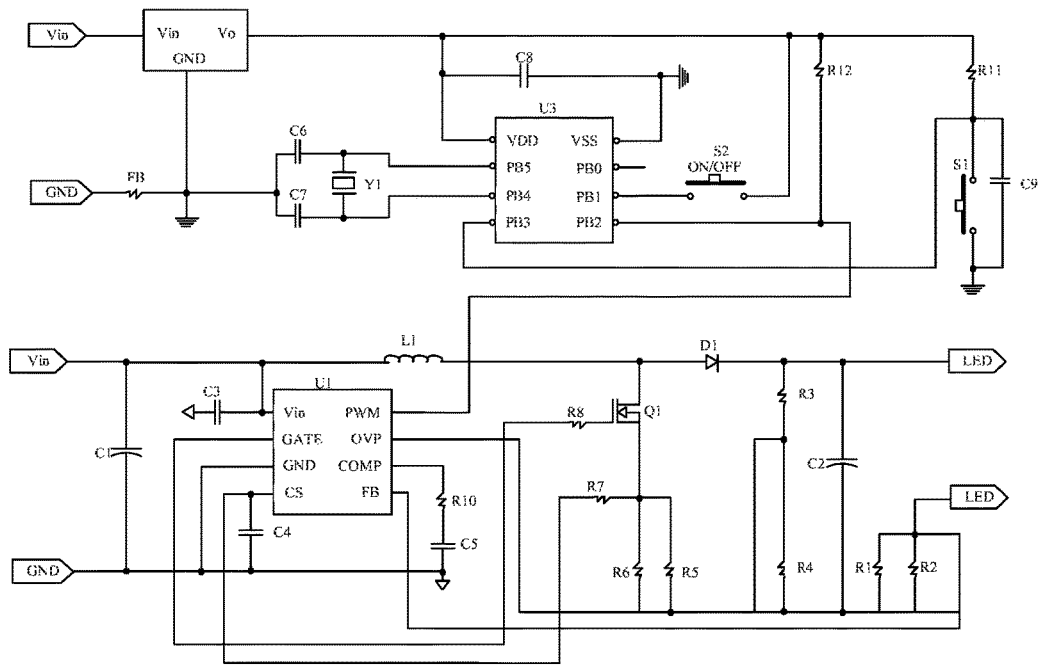
FIG. 5 is a schematic diagram of a circuit of a light emitting device in the third embodiment of the present disclosure.

This embodiment provides a light emitting device, which has a structure similar to that of the light emitting device of the second embodiment. As shown in FIG. 5, the circuit of the light emitting device mainly includes two parts. One part is a driving circuit of the LED lamp (light source), which converts a DC voltage of 15 V input from a power supply into a constant DC current of 0.4 A so as to provide the constant DC current to the LED lamp. The other part is a timing dimming control circuit, which is connected to an enable control port PWM of the driving circuit via the output port PB2, and controls the operating state of the driving circuit according to a high-level control signal with a duration of 13 hours, a control signal with a duration of 1 hour gradually changing from a high level to a low level, a low-level control signal with a duration of 9 hours, and a control signal with a duration of 1 hour gradually changing from the low level to the high level, thus achieving timing and dimming control. Here, the timing diagram of the control signal output by the MCU controller is shown in FIG. 3.

Fourth Embodiment

This embodiment provides a method of regulating plant growth using the light emitting device of the above embodiments.

Specifically, the light emitting device irradiates a plant by following steps below in a circular manner:

irradiating, by the light emitting device with a high-level control signal, the plant for $h_1$ hour(s);

irradiating, by the light emitting device with a control signal gradually changing from a high level to a low level, the plant for $h_2$ hour(s);

irradiating, by the light emitting device with a low-level control signal, the plant for $h_3$ hour(s); and irradiating, by the light emitting device with a control signal gradually changing from the low level to the high level, the plant for $h_4$ hour(s), wherein $h_1+h_2+h_3+h_4=24$.

Apparently, specific implementations of the above embodiments may be variously modified; for example, the length of time of transition from a low level to a high level, the length of time of transition from a high level to a low level, or the like may be adjusted according to specific usage conditions. When different plants are irradiated, specific value of the high level can be adjusted as required.

It can be understood that, the above implementations are merely exemplary implementations used for explaining the principle of the present disclosure, but the present disclosure is not limited thereto. For those skilled in the art, various modifications and improvements may be made without departing from the spirit and essence of the present disclosure, and these modifications and improvements are also deemed as falling within the protection scope of the present disclosure.

The invention claimed is:

1. A light emitting device, comprising a light source, a drive module and a dimming control module; wherein the drive module is connected to the light source and the dimming control module, the dimming control module is configured to output a control signal to the drive module, the drive module is configured to adjust brightness of the light source according to the control signal, and the dimming control module comprises a first controller configured to perform pulse width modulation (PWM), wherein by means of pulse width modulation, the first controller sequentially outputs;

a high-level control signal with a duration of $h_1$;

a control signal with a duration of $h_2$ in transition from a high level to a low level;

a low-level control signal with a duration of $h_3$; and a control signal with a duration of $h_4$ in transition from the low level to the high level.

2. The light emitting device according to claim 1, wherein the drive module comprises:

a signal receiving terminal for receiving the control signal; and a current adjusting unit configured to adjust an amount of a current input to the light source according to the control signal.

3. The light emitting device according to claim 1, wherein the first controller circularly outputs the control signal with a duration of $h_1$, the control signal with a duration of $h_2$, the control signal with a duration of $h_2$, and the control signal with a duration of $h_4$, and $h_1+h_2+h_3+h_4=24$ hours.

4. The light emitting device according to claim 1, wherein the dimming control module further comprises a second controller, which controls the first controller to reset and output the high-level control signal with a duration of $h_1$ when turned on.

5. The light emitting device according to claim 1, wherein the drive module comprises a direct current-direct current (DC-DC) controller, and the dimming control module further comprises a third controller, which controls the DC-DC controller to turn off and controls the first controller to output the low-level control signal with a duration of $h_3$ when turned on.

6. The light emitting device according to claim 1, wherein the first controller comprises a microcontroller unit (MCU).

7. The light emitting device according to claim 6, wherein the MCU comprises a control chip, a voltage regulator, a sixth capacitor and a seventh capacitor; a sixth port of the control chip is connected to an output port of the voltage regulator, and a seventh port of the control chip is connected to the ground; one terminal of each of the sixth capacitor and the seventh capacitor is connected to the ground, and the other terminals of the sixth capacitor and the seventh capacitor are connected to a fifth port and a fourth port of the control chip, respectively.

8. The light emitting device according to claim 1, wherein the light source comprises an LED lamp.

9. The light emitting device according to claim 5, wherein the DC-DC controller comprises a power input port, a gate, a ground port, a current sampling port, a PWM receiving port, an output overvoltage protection port, an analog comparator port, and a voltage feedback port.

10. A method of regulating plant growth using the light emitting device according to claim 1 wherein the light emitting device irradiates a plant by following steps of:

irradiating, by the light emitting device, the plant for $h_1$ hour(s), wherein the control signal is at a high level;

irradiating, by the light emitting device, the plant for $h_2$ hour(s), wherein the control signal is in transition from a high level to a low level;

irradiating, by the light emitting device, the plant for $h_3$ hour(s), wherein the control signal is at a low level; and irradiating, by the light emitting device, the plant for $h_4$ hour(s), wherein the control signal is in transition from the low level to the high level, and $h_1+h_2+h_3+h_4=24$.

11. The method of regulating plant growth according to claim 10, wherein $h_1$ is 13 hours, $h_2$ is 1 hour, $h_3$ is 9 hours, and $h_4$ is 1 hour.

* * * * *